United States Patent [19]

DiSimone et al.

[11] Patent Number: 5,012,568
[45] Date of Patent: May 7, 1991

[54] METHOD FOR INSTALLING AND REPLACING PARTS IN AN INJECTION MOLDING MACHINE

[75] Inventors: John DiSimone, Woodbridge; Paul Brown, Orangeville; Christopher Huntington, Everett, all of Canada

[73] Assignee: Husky Injection Molding Systems Ltd., Bolton, Canada

[21] Appl. No.: 457,188

[22] Filed: Dec. 26, 1989

Related U.S. Application Data

[62] Division of Ser. No. 274,469, Nov. 18, 1988, Pat. No. 4,929,166.

[51] Int. Cl.⁵ .............................................. B23P 19/04
[52] U.S. Cl. .............................. 29/402.08; 29/402.03; 264/328.7; 425/190; 425/192 R; 425/338; 425/451.3; 425/589
[58] Field of Search ........... 29/402.01, 402.03, 402.08; 264/328.7; 425/185, 190, 338, 589, 451.3, 192 R, DIG. 5

[56] References Cited

U.S. PATENT DOCUMENTS

| | | |
|---|---|---|
| 3,174,189 | 3/1965 | Cutler et al. . |
| 4,154,566 | 5/1979 | Ward . |
| 4,408,981 | 10/1983 | Brown . |
| 4,416,604 | 11/1983 | Bender et al. . |
| 4,473,346 | 9/1984 | Hehl . |
| 4,500,274 | 2/1985 | Cyriax et al. . |
| 4,500,275 | 2/1985 | Ruhl . |
| 4,555,228 | 11/1985 | Nishiike et al. . |
| 4,622,860 | 11/1986 | Camett et al. ............... 29/402.08 X |
| 4,714,421 | 12/1987 | D'Agostino . |
| 4,718,845 | 1/1988 | Sheffield et al. . |

FOREIGN PATENT DOCUMENTS 0069919 1/1983 European Pat. Off. .

Primary Examiner—Timothy V. Eley
Attorney, Agent, or Firm—Bachman & LaPointe

[57] ABSTRACT

The present invention relates to an injection molding machine having a novel key/slot arrangement for facilitating installation and removal of a central mold portion. The novel key/slot arrangement includes non-uniform width key elements on frame members which support the central mold portion and non-uniform width slots in side portions of the central mold portion for engaging the key elements. The machine further includes a novel rack/gear drive arrangement for insuring a proper positioning of the mold elements at all times.

7 Claims, 4 Drawing Sheets

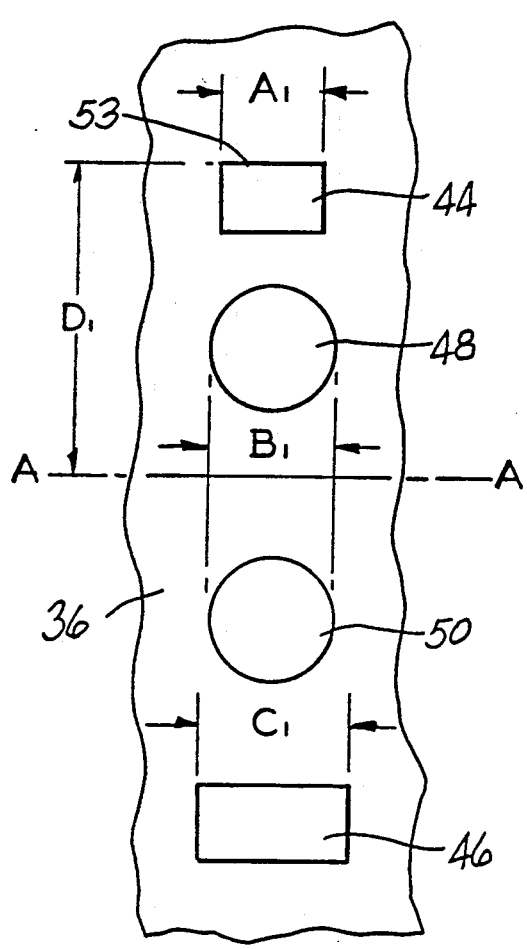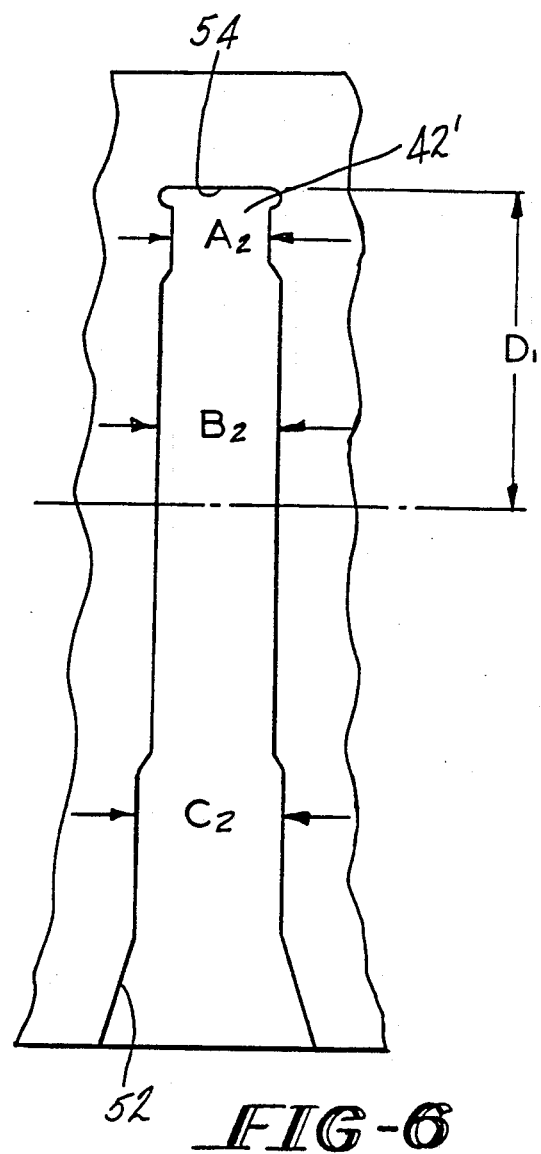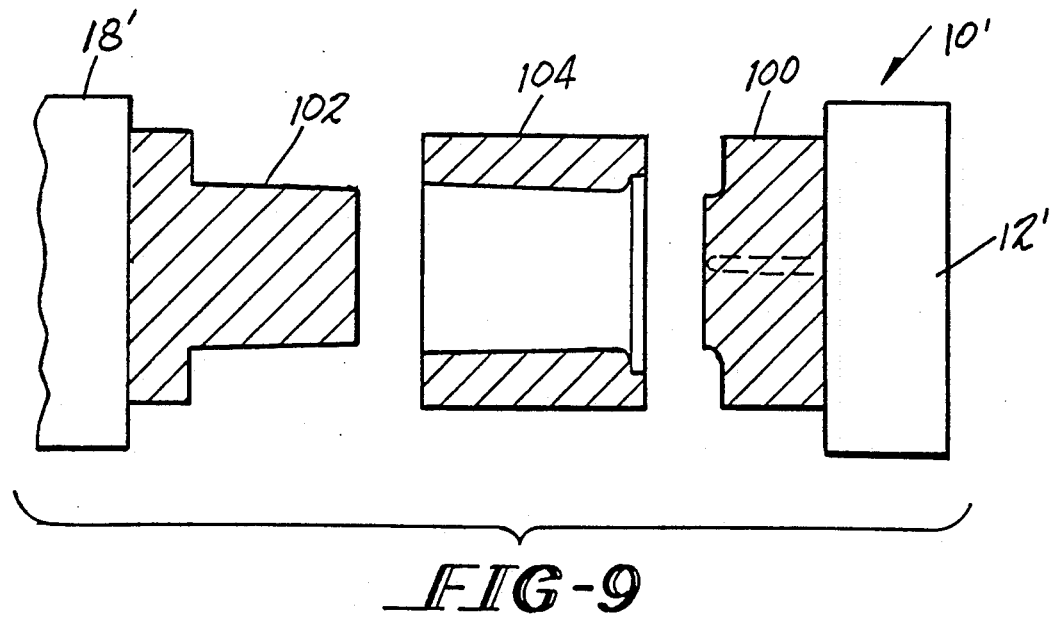

METHOD FOR INSTALLING AND REPLACING PARTS IN AN INJECTION MOLDING MACHINE

This is a division of application Ser. No. 274,469, filed Nov. 21, 1988, now U.S. Pat. No. 4,929,166.

BACKGROUND OF THE INVENTION

The present invention relates to an injection-molding machine having an improved mold support for permitting quick mold removal and installation and a method for quickly removing and installing mold elements. The present invention also relates to an improved drive arrangement for opening and closing the molding machine.

Injection-molding machines generally comprise a stationary platen having a first mold plate, a movable platen having a second mating mold plate, and means for moving the second mold plate toward and away from the first mold plate. U.S. Pat. Nos. 3,174,189 to Cutler et al. and 4,416,064 to Bender et al. exemplify known injection molding machines.

Injection-molding machines are relatively expensive pieces of equipment. Prolonged downtimes to change molds for the production of different items and/or to replace worn or damaged molds are undesirable. Considerable effort has been spent to reduce such downtime by providing molding machines having quick-change mold systems i.e. mold assemblies which can be introduced and removed relatively rapidly. U.S. Pat. No. 4,500,274 to Cyriax et al., for example, shows a quick mold changing method in which a mold is automatically loaded and clamped by means of rollers mounted on the machine platens. U.S. Pat. No. 4,500,275 to Ruhl shows a machine clamping method for quickly clamping the end plates of a mold.

U.S. Pat. No. 4,714,421 to D'Agostino illustrates the use of a "T" slot approach for loading and unloading inserts into mold bases. In this approach, each clamping plate is machined to provide a "T" slot for the extending ears of a T-plate which mates with an interchangeable mold plate.

These quick change approaches unfortunately cannot be applied to stack mold injection molding machines. Such machines are popular because they can be used to increase production. They typically comprise three or more mold plates arranged so as to permit opposing faces of adjacent mold plates to be brought together. U.S. Pat. Nos. 4,154,666 to Ward and 4,408,981 to Brown illustrate known stack mold injection molding machines.

One of the problems faced by all stack mold injection molding machines is proper alignment of the mold plates. For a stack mold to operate properly, the mold plates must have equal spacing between them at all times. Ward and Brown both use a rack and pinion arrangement to maintain proper spacing between the mold plates.

Another problem with stack mold injection molding machines is the provision of adequate support for the center section of the stack mold. In the Brown patent, a support device is attached to the sides of the stack mold center section and slides along the lower tiebars of the molding machine. The support is restrained from lifting off the tiebar by stirrups which run under the lower tiebar. One of the disadvantages associated with this approach is if the tiebar is supported directly on pads mounted on the machine base at regular intervals then the stirrups would foul the pads as the mold opens and closes. A second disadvantage is that the support device is fastened to the mold, including the ends of the racks, and must be removed before the mold can be removed from the machine, since otherwise it would foul the top tiebars. Still further, the support device must be mounted separately after the mold is loaded into the machine. These additional assembly operations are not conducive to quick mold changing.

As previously discussed, the ability to quickly change molds is desirable from the standpoint of reduced downtime and increased productivity. There is currently available a stack mold injection-molding machine produced by Klockner-Windsor having a mounting frame intended to facilitate quick mold changes. There are however several problems with this machine. For example, the tiebars of the machine pass through bushed holes in the frame. This makes the frame an integral part of the machine, not easily removable without pulling the tiebars. The stability of the frame is questionable as its span of support is limited to its thickness and consequent length of the bushings in the frame. This problem is manifested by the frame tipping or rocking as the mold is clamped or more particularly as it is unclamped. The clearance in the short bushings and the large overhanging mass of the mold cavity halves causes the vertical alignment of the mold's center section to vary which in turn causes wear on the mold's sealing surfaces.

The "Windsor" frame has a vertical key on its inner surface which corresponds with a vertical slot on the outer surface of the mold's center section. Vertical positioning of the mold is achieved by accurately controlling the length of the slot in the mold and the height of the key on the frame. Lateral alignment is achieved by spacers attached to the mold sides which fit against the inner surface of the frame. This arrangement has a major problem when it comes to loading and unloading the mold. The key/slot fit is by definition a close tolerance and the mold must therefore be lowered very accurately and in near perfect alignment with the key to prevent cocking or jamming as it is lowered. Similarly when lifting the mold out, this must be done with very accurate vertical alignment, particularly when the mold has almost left the key/slot engagement. Here there is a great tendency for the mold to cock or jam in the key.

Still another disadvantage of the "Windsor" frame is that the drive mechanism reduces the available space for the operator to reach into the mold area. This is due to its mounting above the lower tiebar. This can be a considerable disadvantage when starting up the mold as the operator must reach into each mold cavity to quickly clean the gates.

The present invention is intended to overcome these disadvantages. Accordingly, it is an object of the present invention to provide an injection molding machine having an improved frame for supporting and facilitating the quick removal and installation of mold portions.

It is a further object of the present invention to provide a frame as above having particular utility as a stack mold support.

It is yet a further object of the present invention to provide an improved rack/gear drive arrangement for an injection molding machine.

It is still further object of the present invention to provide an improved method for removing and installing mold portions.

These and other objects and advantages of the present invention will become more apparent from the following description and drawings in which like reference numerals depict like elements.

SUMMARY OF THE PRESENT INVENTION

The foregoing objects are achieved by the injection molding machine of the present invention which in one embodiment may include a stationary platen, a plurality of tiebars extending from the stationary platen, an outer platen movable along the tiebars, a moveable central portion of a mold element such as a stack mold, and a movable frame attached to each side of the movable central portion. The frame includes means for engaging a slot in a sidewall of the central portion so as to enable and facilitate quick removal and installation of a mold element such as the stack mold. In a stack mold machine, each platen may carry at least one mold plate engageable with a corresponding mold plate in the stack mold. The frame engaging means may comprise a pair of spaced apart key members and/or at least two spaced apart cam rollers on an inside surface of each movable frame member.

The injection-molding machine of the present invention further comprises a rack/gear drive arrangement for assuring proper spacing between the mold elements at all times. The drive arrangement comprises at least one rack attached to the stationary platen, first gear means attached to the movable outer platen for engaging the at least one rack, second gear means driven by the first gear means, and at least one smaller rack attached to the frame joined to a movable central mold portion and engaged by the second gear means. In a preferred embodiment, a rack/gear drive arrangement is provided on each side of the injection molding machine.

The injection-molding machine of the present invention further comprises an improved tiebar bearing block arrangement for substantially preventing tipping or rocking of the frame. The improved bearing block arrangement includes upper tiebar support blocks and wedge blocks bolted to each frame to act as a retainer.

With the present invention, a stack mold can be inserted into the machine in the following manner. First, each frame member is installed between respective upper and lower tiebars. Then the stack mold is lowered into the machine using a crane hook connected to an eyebolt on an upper surface of the stack mold. The mold is lowered into the machine until the slot in each sidewall of the stack mold engages the key members and/or cam rollers on the inside surface of the movable frame members. The slots and the key members and/or cam rollers insure proper vertical and horizontal alignment of the stack mold relative to the center line of the machine.

To remove the old stack mold and replace it with a new mold, the old stack mold is first lifted out of the machine by attaching a crane hook to the eyebolt. Then the new stack mold is lowered into the machine in the manner previously discussed.

BRIEF DESCRIPTION OF THE DRAWINGS

FIG. 5 is a view of the inside surface of the frame of FIG. 4;

FIG. 6 is a view of a mating slot in a sidewall of the platen portion of the stack mold;

FIG. 9 illustrates a non-stack mold injection molding machine in which the support device of the present invention can be used.

DETAILED DESCRIPTION OF THE INVENTION

As previously discussed, the present invention relates to an injection-molding machine 10 having an improved support device which allows rapid removal and installation of mold portions such as a stack mold and an improved gear/rack drive arrangement for opening and closing the machine.

Figure 1:
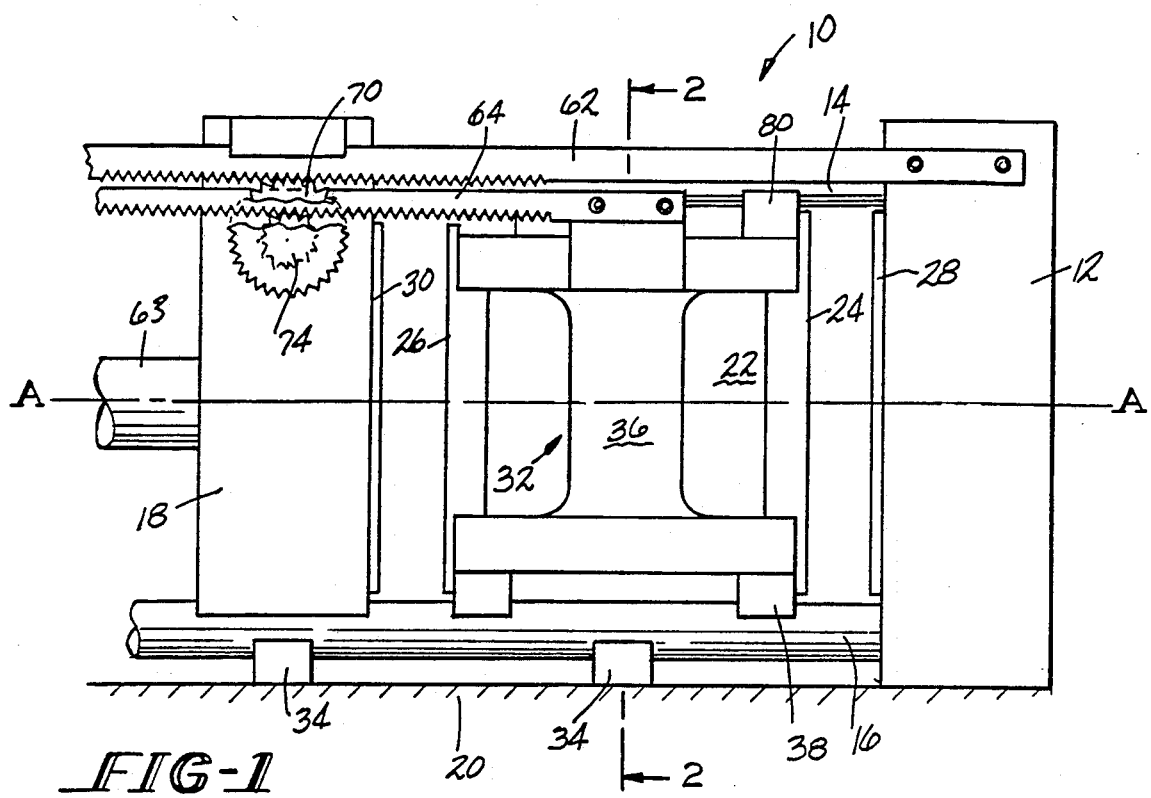
FIG. 1 is a side view of a stack mold injection molding machine in accordance with the present invention.

The injection molding machine of the present invention, as shown in FIG. 1, may have a base or bed 20 fixedly supporting a stationary platen 12 from which four tiebars extend to another fixed part not shown of the machine. The tiebars are arranged in upper and lower pairs 14, 14', 16, and 16' respectively. A movable outer platen 18 is slidably supported on the tiebars for reciprocable movement between a mold open and a mold closed position. Any suitable conventional drive mechanism such as ram 63 may be provided to move the platen 18 between its open and closed positions.

If the machine 10 is a stack mold injection molding machine, a stack mold 22 is disposed between the platens 12 and 18. The central portion of the stack mold supports two mold plates 24 and 26 which respectively coact with mold plates 28 and 30 carried on platens 12 and 18.

Figure 3:
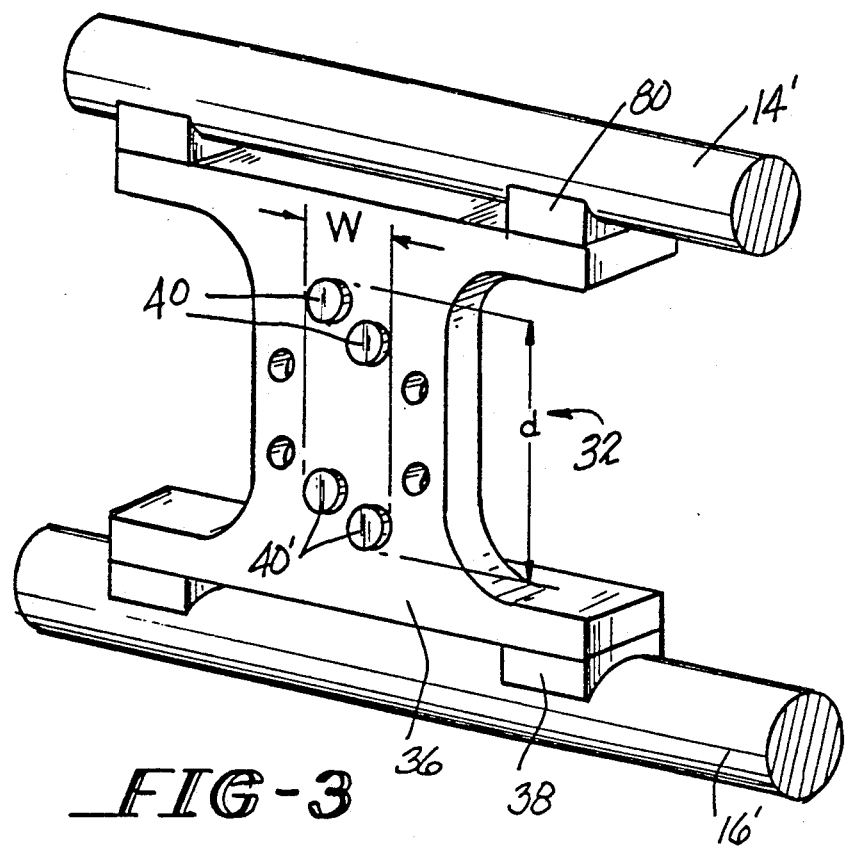
FIG. 3 is a perspective view of a first embodiment of the inside of the frame portion of the stack mold support device.

The central portion is fastened to two stack mold support devices 32, one positioned on each side of the central portion. Each support device 32 is mounted to the injection molding machine, preferably permanently, and rests on one of the lower tiebars 16, 16' which are in turn supported on the machine base or bed 20 by pads 34. As shown in FIG. 3, each support device preferably comprises an H-shaped frame member 36 onto which is mounted four bearing blocks or shoes 38 and 80. The shoes 38 and 80 may be mounted to the frame member 36 in any desired manner. The two lower shoes 38 slide on one of the lower tiebars 16, 16' while the two upper shoes 80 slide on the underside of one of the upper tiebars 14, 14'. In this way, each support device 32 is trapped between the upper and lower tiebars and is readily slidable therealong.

As previously discussed, stack molds often have to be changed for various reasons i.e., the machine is used to make different parts or the stack mold has been damaged or worn. To minimize downtime, it is desirable that suitable means be provided to facilitate removal and installation of the stack mold.

Some machines such as the Windsor Machine utilize a frame having a continuous vertical key on its inner surface and a corresponding vertical slot on the outer surface of the mold's center section for this purpose. Vertical positioning of the mold is achieved by controlling the length of the slot in the mold and the height of the key on the frame. Lateral alignment is generally achieved through the use of spacers attached to the mold sides which fit against the inner surface of the frame. These often have to be customized for each installation. This arrangement has a major problem when it comes to loading and unloading the mold. The key/slot fit is by definition a close tolerance and the mold must therefore be lowered very accurately and in near perfect alignment with the key to prevent cocking or jamming as it is lowered. Similarly when lifting the mold out, this must be done with very accurate vertical alignment, particularly when the mold has almost left the key/slot engagement. Here there is a great tendency for the mold to cock or jam in the key.

Figure 4:
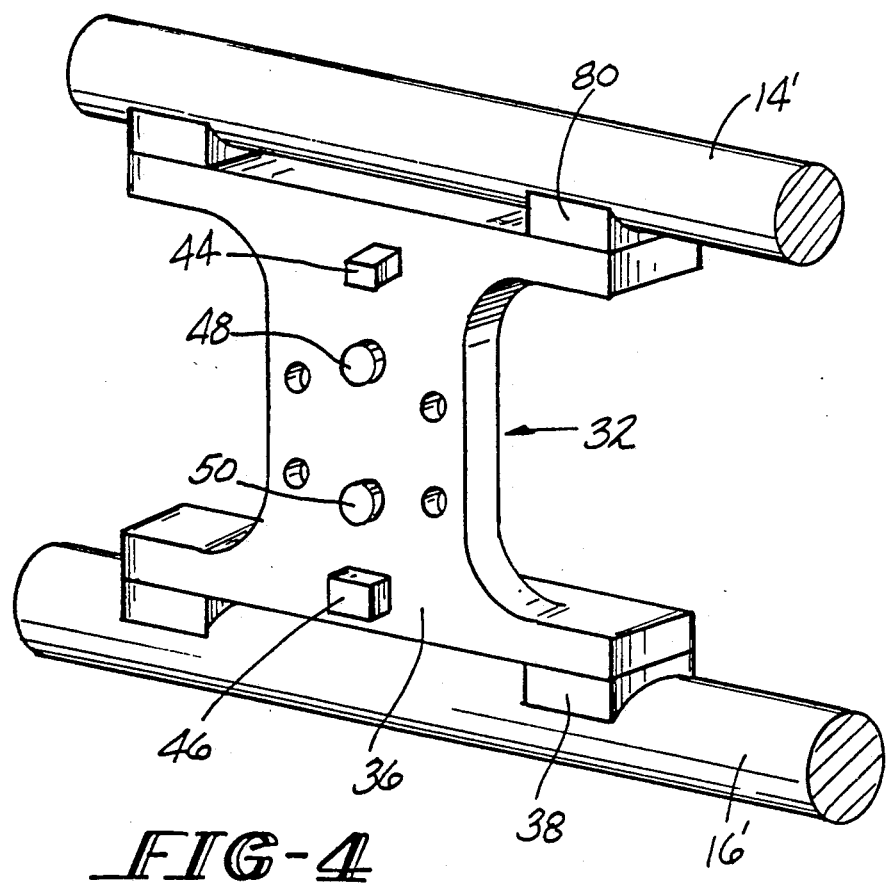
FIG. 4 is a perspective view of a second embodiment of the inside of the frame portion of the stack mold support device.

The present invention avoids these difficulties through the use of a novel key/slot arrangement between the central portion of the stack mold and each of the stack mold support devices 32. As shown in FIGS. 3 and 4, the inside surface of each support device 32 is provided with two or more spaced apart key members engageable with a matching slot 42 on a side of the stack mold central portion.

The key members may comprise as shown in FIG. 3, upper and lower pairs of cam rollers 40, 40' spaced apart a distance d substantially equal to the length of the slot. Each pair may be arranged so as to define a width w slightly less than the width of the slot. It has been found that the use of this type of cam roller arrangement is advantageous in providing a smoother easier means of loading and unloading the mold.

In a preferred embodiment of the present invention, the key members comprise as shown in FIGS. 4 and 5, an upper key element 44, a lower key element 46 and intermediate, spaced apart rollers 48 and 50. As can be seen from FIG. 5, the upper key element 44 has the smallest width A1, the lower key element 46 has the greatest width C1, and each of the rollers has an intermediate diameter or width B1 so the $A1 < B1 < C1$. In addition, the top surface of the upper key element 44 is spaced a distance D1 above the centerline of the machine.

FIG. 6 illustrates the corresponding widths of the slot 42' in each sidewall of the stack mold central portion. The location of surface 54 of the slot 42' is preferably closely controlled so that when this surface contacts the upper surface 53 of key element 44, the mold's vertical height is accurately positioned with respect to the machine's center line A—A. As can be seen from the Figures, the slot 42' widens at its bottom opening 52 to provide easy engagement and disengagement when loading or unloading the stack mold in the machine.

By using the key/slot arrangement of FIGS. 5 and 6, the keys and rollers have ample clearance between the mold's slot as the stack mold is loaded or unloaded. The upper key element 44 has the narrowest width A1. Thus when the stack mold is initially lowered, the bottom opening 52 easily engages the key 44 without jamming or cocking. As the stack mold continues to be lowered, comparatively wide slot dimension C2 also easily passes over upper key element 44. The dimension C2 is more closely fitting to the diameter of rollers 48 and 50 and only finally reaches a close tolerance fit when the stack mold is lowered sufficiently for it to reach lower key element 46 having a width C1. Dimension C1 may typically be 0.002-0.005" less than dimension C2 whereas width B1 is typically 0.080" less than dimension C2 and width A1 is typically 0.160" less than dimension C2. Similarly width A2 in the slot is typically only 0.002-0.005" more than upper key element width A1. Engagement does not occur here until the stack mold is almost completely lowered into position. Removing the mold similarly disengages the closely fitting surfaces first and provides ample clearance for the withdrawal of the slot 42' from the spaced apart key elements 44 and 46, preventing jamming or cocking as the mold is about to leave engagement with the frame.

To facilitate loading and unloading of the stack mold, an eyebolt 56 is provided at the top of the stack mold 22. The complete stack mold may be loaded into and removed from the machine 10 from the top while suspended from a suitable crane device via the eyebolt 56.

The manner in which the various mold components are driven is quite important in stack mold machines. For a stack mold to operate properly, the mold plates must have equal spacing between them at all times. The injection molding machine of the present invention is characterized by an improved rack/gear arrangement for insuring such equal spacing between the mold plates.

Figure 2:
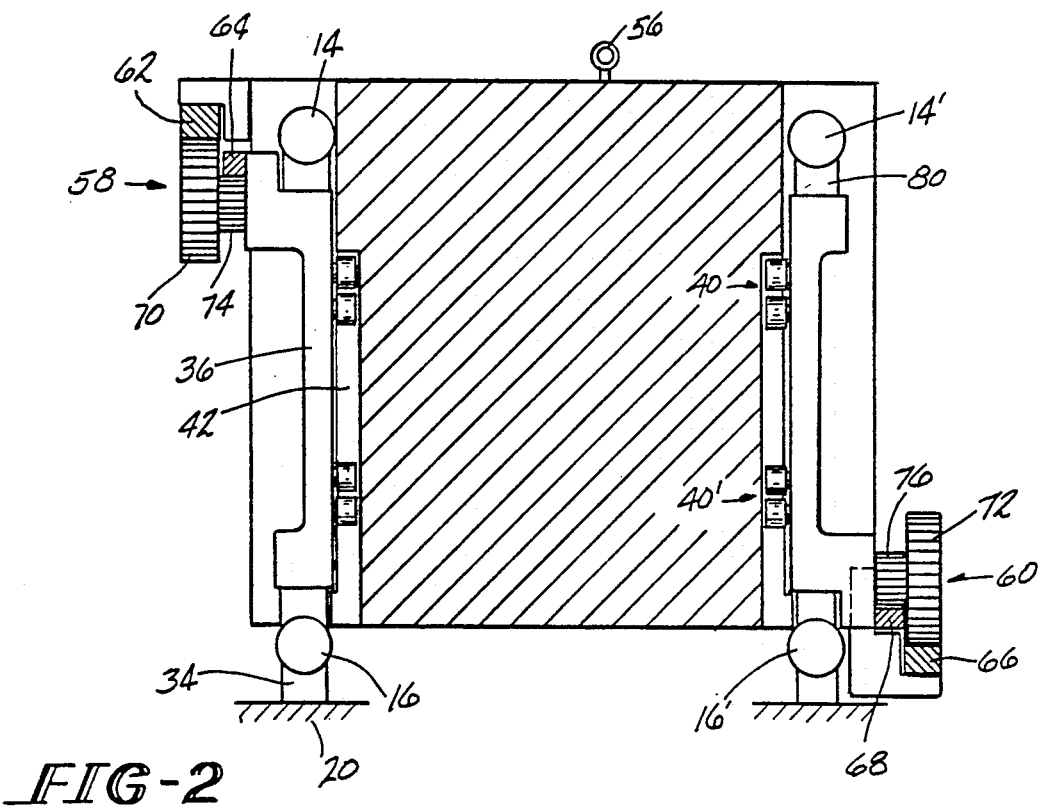
FIG. 2 is an end view of a stack mold illustrating the rack/gear assemblies for driving the stack mold.

As shown in FIGS. 1 and 2, the rack/gear drive assembly comprises upper and lower drive assemblies 58 and 60 respectively. The upper drive assembly 58 is preferably placed on the operator's side of the machine so as to be substantially clear of the operator's work area and maximize operator access to the molds.

The upper drive assembly 58 includes a rack 62 fixed to an upper portion of the stationary platen 12 and a smaller rack 64 fixed to an upper portion of one of the support devices 32. The lower drive assembly 60 includes a rack 66 fixed to a lower portion of the stationary platen 12 and a smaller rack 68 fixed to a lower portion of the opposite support device 32. The drive assemblies further include gears 70 and 72 rotatably mounted on the movable platen 18 for engaging rack 62 and 66 respectively and smaller gears 74 and 76 fastened to the gears 70 and 72 respectively. The smaller gears are exactly one-half of the diameter of the larger gears and are arranged to engage racks 64 and 68 respectively.

In operation, the outer platen 18 is moved by a drive mechanism not shown such as the ram 63. As the platen 18 moves, the racks 62 and 66 drive the gears 70 and 72 which in turn drive the smaller gears 74 and 76. Because of their diameter, the smaller gears 74 and 76 drive the racks 64 and 68 half the distance of the movement of platen 18 along racks 62 and 66. Since the racks 64 and 68 are fastened to the movable support devices 32, the central portion stack mold is moved half the distance which the platen 18 moves. Using this improved rack/gear drive assembly, it can be assured that the stack mold central portion is always substantially centered between the stationary platen 12 and the movable platen 18.

Figure 7:
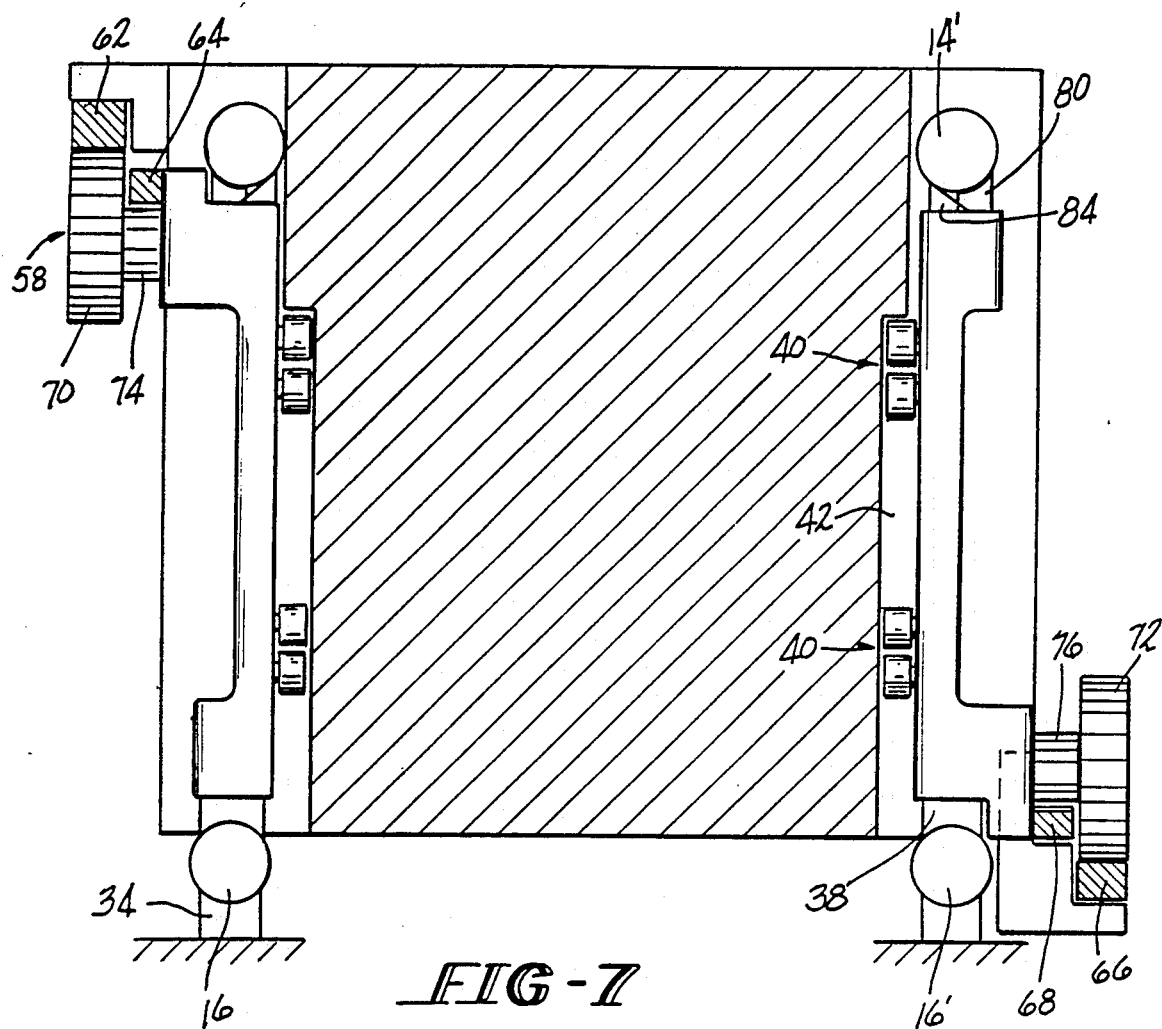
FIG. 7 is an end view of an alternative stack mold arrangement with upper tiebar support blocks.

In stack mold injection molding machines, mold support is also quite important. One of the further advantages of the present invention is that the machine 10 is characterized by a much stiffer, wider bearing frame to support the stack mold. This is in large part accomplished by the use of the tiebar bearing blocks or shoes 38 and 80. As can be seen from FIGS. 1 and 7, these blocks are widely spaced on both the upper and lower tiebars. As a result, they substantially prevent any tendency for the center section to tip or rock.

Figure 8:
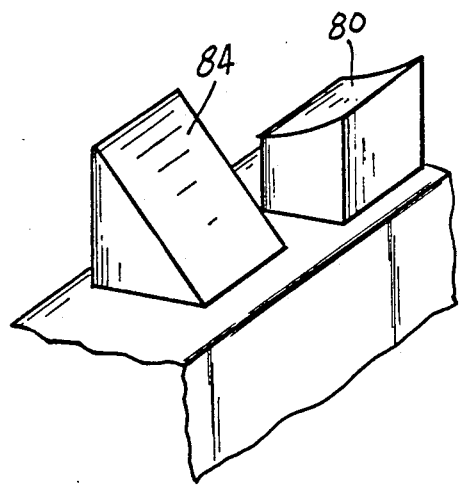
FIG. 8 is an isometric view of the support blocks of FIG. 7.

In a preferred arrangement, as shown in FIG. 8, the upper tiebar support blocks 80 extend inwardly only to the centerline of the upper tiebar. This allows the frame assembly resting on the lower tiebar to be swung away from the upper tiebar for easy removal if needed. A wedge block 84 is installed after the frame has been swung into position to act as a retainer. The block 84 is bolted to the frame 36 to keep the upper tiebar block 80 in contact with the upper tiebar.

While the present invention has been described in the context of a stack mold injection-molding machine, it should be appreciated that the mold support of the present invention as well as the drive arrangement has broader application. For example, the support device may be used in a simple single face mold having portions that require independent support.

FIG. 9 illustrates a non-stack mold machine 10' in which the support system and the drive arrangement of the present invention may be used. The machine 10' has a stationary platen 12' with a gate pad 100, a moving platen 18' with a core 102, and a movable cavity 104 shaped so as to form a molded part with an undercut feature. The cavity 104 may be supported from a movable frame member such as that shown in FIG. 4 by providing a slot such as that shown in FIG. 6 in each of its sidewalls for engaging the key and/or roller elements on the frame member.

In a machine such as that shown in FIG. 9, a drive arrangement similar to that shown in FIGS. 1 and 2 may be utilized. The ratio of the gears would likely be changed from 2:1 so that the central movable cavity portion is not necessarily midway between the mold halves. By installing a larger or smaller inner gear, the ratio of motion can be changed so as to allow close control of the space between the opening sections of the mold.

It is apparent that there has been provided in accordance with this invention a mold support for quick mold changing which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claim is:

1. A method for installing and replacing a stack mold in an injection molding machine having a stationary platen, upper and lower tiebars extending from said stationary platen, and an outer platen movable along said tiebars, said method comprising:
    providing first and second frame members each having shoes on upper and lower surfaces for contacting respective surfaces of said upper and lower tiebars and means for engaging and retaining said stack mold;
    placing said first frame member between a first upper tiebar and a first lower tiebar and said second frame member between a second upper tiebar and a second lower tiebar;
    installing wedge blocks on each said frame member to retain each said upper shoe in contact with its respective upper tiebar; and
    mounting said stack mold to said frame members.

2. A method in accordance with claim 1 wherein said mounting step comprises providing a non-uniform width slot in two opposed side portions of the stack mold and lowering said stack mold into said machine until each slot is engaged by said engaging means on a respective one of said frame members.

3. A method in accordance with claim 2 which further comprises forming said engaging means on each frame member with a first key element having a first width, a second key element spaced from said first key element and having a second width greater than said first width, and at least one roller intermediate said first and second key elements having a third width which is greater than said first width and less than said second width;
    forming said slot in each side portion with a width at its top surface slightly larger than said first width and a width at its bottom portion greater than said second width; and
    said lowering step comprising initially lowering the mold until the bottom portion of each said slot engages said first key element on a respective frame member and thereafter continuing to lower the mold until the top surface of each slot contacts a surface of said first key element on a respective frame member,
    whereby said non-uniform width slot helps prevent jamming and cocking during said lowering step.

4. A method in accordance with claim 3 which further comprises:
    withdrawing said stack mold from the machine; and
    replacing it with a new stack mold by lowering said new mold into contact with said engaging means on said frame members.

5. A method for installing and replacing a central mold portion in an injection molding machine having a stationary platen, upper and lower tiebars extending from said stationary platen, and an outer platen movable along said tiebars, said method comprising:
    providing said central mold portion with a slot in two opposed side portions;
    providing first and second frame members each having means for contacting respective surfaces of said upper and lower tiebars;
    providing each of said first and second frame members with means for engaging one of said slots in said central mold portion;
    placing said first frame member between a first upper tiebar and a first lower tiebar and said second frame member between a second upper tiebar and a second lower tiebar; and
    lowering said central mold portion into said machine until each said slot is engaged by said engaging means on a respective one of said frame members.

6. The method of claim 5 wherein said central mold portion providing step comprises providing said central mold portion with a non-uniform width slot in each of said two opposed side portions.

7. The method of claim 5 further comprising:
    removing an installed central mold portion by raising said central mold portion until said engaging means on said frame members are no longer in contact with said slots in said central mold portion; and
    lowering a replacement central mold portion into said machine so that slots in opposed side walls of said replacement central mold portion contact said engaging means on said frame members.

* * * * *